United States Patent [19]
Oh et al.

[11] Patent Number: 5,646,699
[45] Date of Patent: Jul. 8, 1997

[54] CDP-INCORPORATED TELEVISION RECEIVER WHICH SELECTS A SIGNAL BASED ON A TYPE OF COMPACT DISK DETECTED

[75] Inventors: Ji-byoung Oh, Suwon; Moon-hwan Suh, Seoul; Jang-earn Leim, Suwon, all of Rep. of Korea

[73] Assignee: Samsung Electronics Co., Ltd., Kyungki-do, Rep. of Korea

[21] Appl. No.: 481,078

[22] Filed: Jun. 7, 1995

[30]  Foreign Application Priority Data

Oct. 20, 1994 [KR] Rep. of Korea ............... 94-26861

[51] Int. Cl.$^6$ ................................. H04N 5/44
[52] U.S. Cl. ............. 348/553; 348/563; 348/725; 348/730; 348/738
[58] Field of Search ................. 348/553, 554, 348/563, 722, 725, 729, 730, 734, 736, 738, 552; 358/180, 188, 189, 190, 196, 198, 322, 342; 434/307 A, 308, 307 R; H04N 5/44, 5/445, 5/222, 5/63, 5/60

[56]  References Cited

U.S. PATENT DOCUMENTS 5,486,645  1/1996  Suh ............................ 358/335
5,496,178  3/1996  Back ........................... 348/725

Primary Examiner—Sherrie Hsia
Attorney, Agent, or Firm—Sughrue, Mion, Zinn, Macpeak & Seas

[57]  ABSTRACT

A compact-disk-player-incorporated television receiver includes; in a single case, a television signal receiver for receiving a tuned television signal and detecting video and audio signals from the received signal and outputting the same, a compact disk player having a song accompaniment function for receiving a first control signal input as data and a second control signal input via an instruction input unit, reading data from at least one type of compact disk if the two control signals are identical, and then outputting video and audio signals, a video signal processor for selectively receiving and signal-processing a video signal from the television signal receiver or a video signal from the compact disk player and displaying the processed signal via a display, an audio signal processor for selectively receiving and signal-processing an audio signal of the television signal receiver or an audio signal of the compact disk player and displaying the processed signal via a sound converter, a power source for receiving alternate power and generating a power signal of the television signal receiver and a power signal of the compact disk player, and a television controller for controlling the power supply of the power source by setting a television mode or compact disk mode selected in response to the second control signal, controlling the signal selection of the video signal processor and audio signal processor, and supplying the first control signal to the compact disk player.

13 Claims, 3 Drawing Sheets

CDP-INCORPORATED TELEVISION RECEIVER WHICH SELECTS A SIGNAL BASED ON A TYPE OF COMPACT DISK DETECTED

BACKGROUND OF THE INVENTION

The present invention relates to a compact disk player (CDP)-incorporated television receiver, and more particularly, to a composite product produced by incorporating a compact disk song accompaniment apparatus within a television receiver.

A compact disk (CD) song accompaniment apparatus (also called a CD-OK apparatus) stores the song accompaniments and lyrics for about 2,000 songs and about 4,000 still screen images on one compact disk. It also reproduces the accompaniment and word data for a selected song, and displays a corresponding screen image suitable for the lyrics as a background screen. Meanwhile, a karaoke television receiver stores the lyric data and accompaniments for about 400 songs and scores of graphics images in a semiconductor memory device, and functions as a karaoke apparatus with CD-graphics level capability. In the case of a CD-OK apparatus having no display unit, the reproduced video signal is transmitted via a connection to an external video connector jack of the television receiver via audio and video output ports, and the video signal is displayed on a CRT and the audio signal is output to a speaker, which is inconvenient for use.

The karaoke television receiver is incorporated within a television set. However, the number of songs which can be reproduced is only about one-fifth that of the CD-OK apparatus, and only a few background graphics image screen levels can be accommodated.

Also, with the current variety of types of compact disks now on the market, e.g., digital audio CDs, graphics CDs and video CDs, a corresponding player is commercially produced for each such type of disk. Thus, separate products are required to reproduce each of the disk types, which is quite costly. Also, the need for separate devices increases the required installation space and results in unsightly external connections. Furthermore, since each product is generally provided with an exclusive-use remote controller, a number of remote controllers are necessary to control the various products.

SUMMARY OF THE INVENTION

In order to solve the above problems, therefore, it is an object of the present invention to provide a compact disk player (CDP)-incorporated television receiver.

To accomplish the above object, the compact disk player incorporated television receiver according to the present invention comprises: a television signal receiver for receiving a television signal, detecting audio and video signals from the received signal and outputting the detected signals; a compact disk player, having a song accompaniment function, for receiving a first control signal and a second control signal input via an instruction input unit, reading data from at least one type of compact disk if the two control signals are identical, and outputting audio and video signals; a video signal processor for receiving and selectively signal-processing the video signal of said television signal receiver and the video signal of said compact disk player, and displaying the processed signal on a display; an audio signal processor for receiving and selectively signal-processing the audio signal of said television signal receiver and the audio signal of said compact disk player, and outputting the processed signal via a sound converter; a power source for receiving power from an external source and generating a power signal for said television signal receiver and a power signal for said compact disk player; and a television controller for setting said power source in one of a television mode and a compact disk mode selected in response to said second control signal input via an instruction input unit, controlling the signal selection of said video signal processor and audio signal processor, and supplying said first control signal to said compact disk player.

The video signal processor comprises a first selector for selecting one of a video signal of said television signal receiver and a video signal of said compact disk player and outputting the selected signal; a video processor for processing the video signal output from said first selector and outputting an RGB signal; a display driver for receiving said RGB signal and displaying a video signal on a display; and a second selector for connecting the video signal of said television signal receiver to an external video input terminal of said compact disk player during a background selection operation while in the compact disk mode.

The audio signal processor comprises an amplifier for amplifying the audio signal of said television signal receiver to a predetermined level; a mixer for mixing a microphone input signal with the audio signal of said compact disk player; a third selector for selecting and outputting one of the audio signal of said amplifier and the audio signal output from said mixer; and an audio output processor for receiving the audio signal selected by said third selector and driving a speaker.

The television signal receiver comprises a fourth selector for selecting and outputting one of the received television signal and at least one externally input video signal.

The audio signal processor comprises a fifth selector for selecting and outputting one of the audio signal from the received television signal and at least one externally input audio signal.

BRIEF DESCRIPTION OF THE DRAWINGS

The above objects and advantages of the present invention will become more apparent by describing in detail a preferred embodiment thereof with reference to the attached drawings, in which.

DETAILED DESCRIPTION OF THE INVENTION

Figure 1:
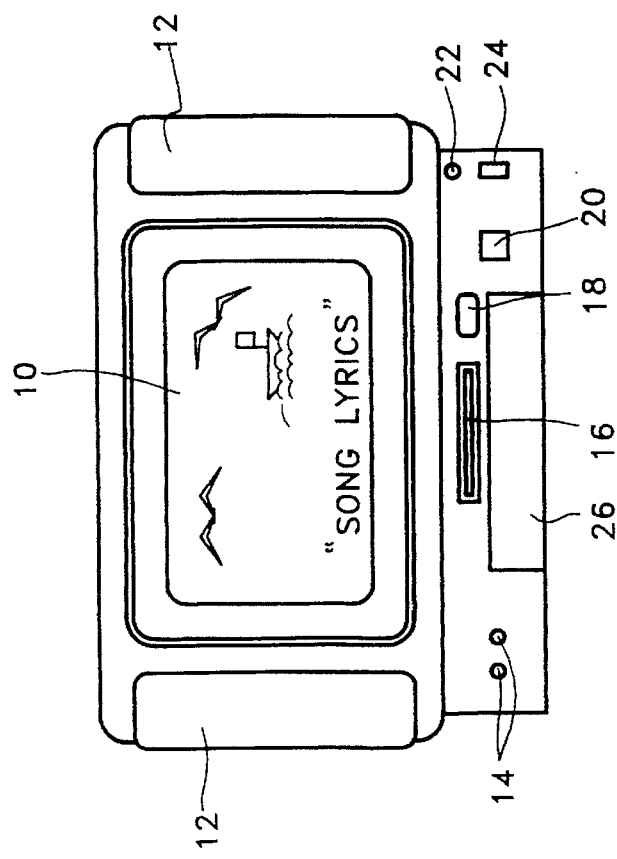
FIG. 1 is a front view of a CDP-incorporated television receiver according to an embodiment of the present invention.

A front view of a CDP-incorporated television receiver according to an embodiment of the present invention is shown in FIG. 1. The CDP-incorporated television receiver includes a CRT 10, a pair of speakers 12, a pair of microphone connecting jacks 14, a disk door 16, an open/close button 18, a receiving window 20 for the transmitted signal from a remote controller (not shown), a power indication lamp 22, a main power button 24, and a control box 26.

Figure 2:
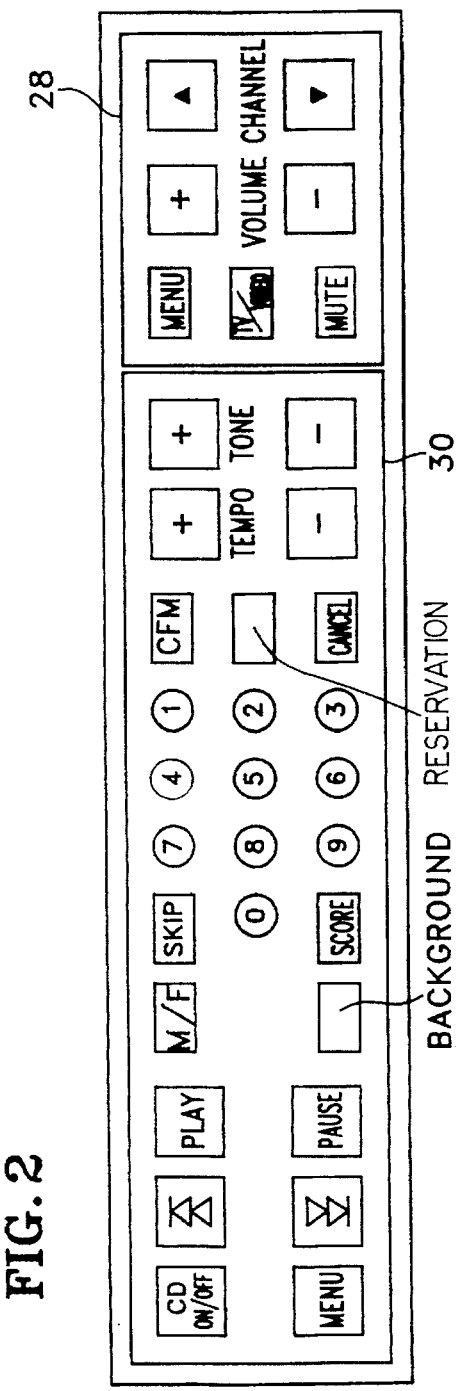
FIG. 2 shows a key arrangement of the CDP-incorporated television receiver control box shown in FIG. 1.

The arrangement of keys provided within control box 26 is shown in FIG. 2. The keys are classified into a television control key portion 28 and a CD control key portion 30. Here, the keys shown correspond to those for a variety of instruction input units, for example, a remote controller or similar controlling device.

The television control key portion 28 includes a channel up/down key, a volume up/down key, a menu key, a TV/Video key, and a mute key. The CD control key portion 30 includes a tone up/down key, tempo up/down key, a confirmation key, a reservation key, a cancellation key, numerical keys (0–9), a skip key, a score display key, a male/female (M/F) discrimination key, a background selection key, a play key, a stop key, a selection up/down key, a CD on/off key, and a menu key.

Figure 3:
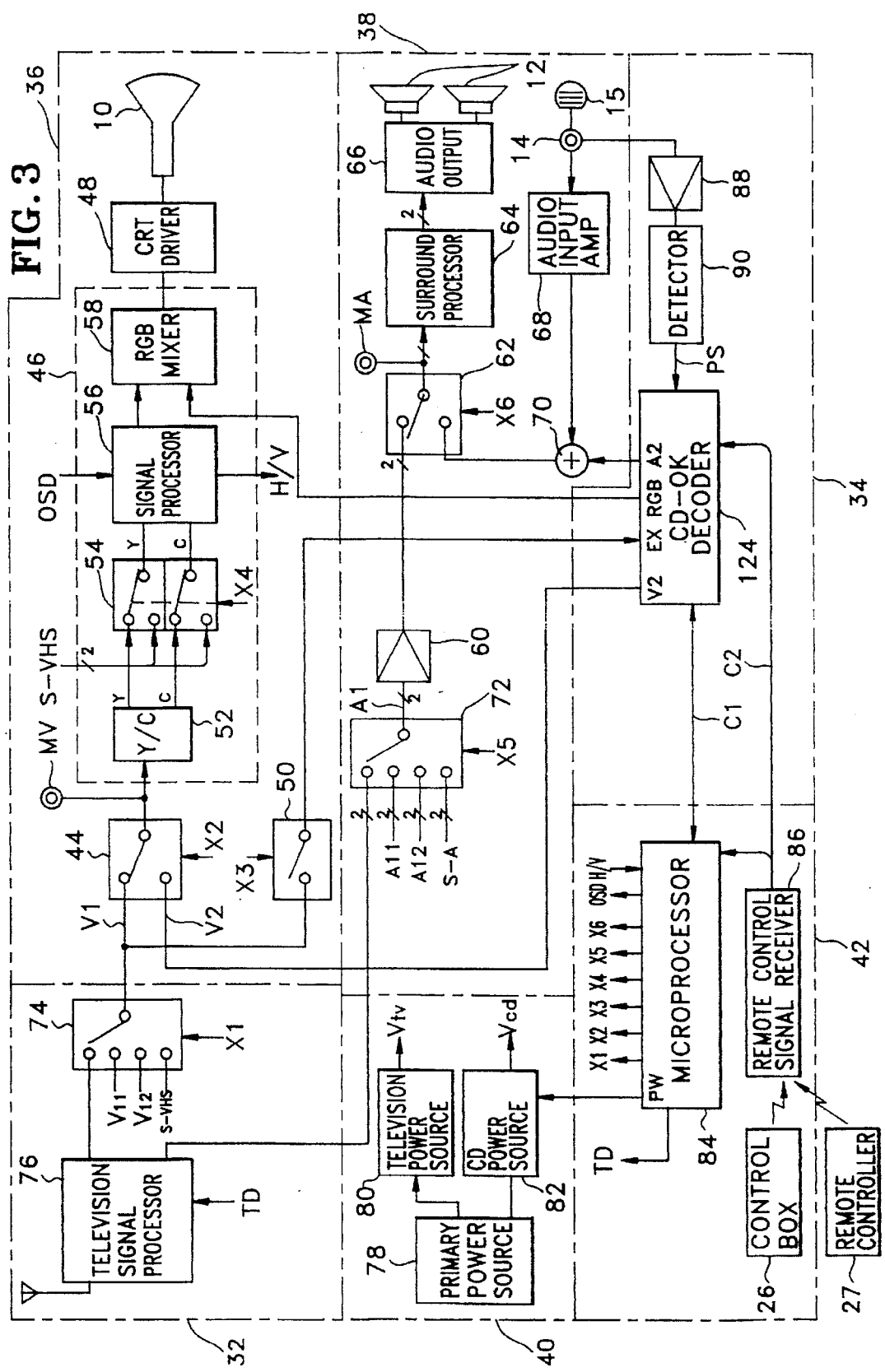
FIG. 3 is a circuit diagram of the CDP-incorporated television receiver according to the present invention.

A circuit diagram of the CDP-incorporated television receiver according to the present invention is shown in FIG. 3. The apparatus shown in FIG. 3 is largely comprised of a television signal receiver 32 for receiving a tuned television signal, and detecting and outputting a video signal and audio signal from the received signal. It also includes a compact disk player 34 having a song accompaniment function for receiving a first control signal input as data and a second control signal input via an instruction input unit, e.g., a remote controller, wherein the compact disk player 34 reads data from at least one type of compact disk if the two control signals are identical and outputs a video signal and audio signal.

Also included in the CDP-incorporated television receiver is a video signal processor 36 for selectively receiving and signal-processing a video signal V1 from television signal receiver 32 or a video signal V2 from compact disk player 34, and displaying the processed signal via CRT 10.

An audio signal processor 38 is included for selectively receiving and signal-processing an audio signal A1 from television signal receiver 32 or an audio signal A2 from compact disk player 34 and outputting the processed signal as sound via a pair of audio converters (speakers) 12.

Furthermore, a power source 40 for receiving AC power and generating a power signal $V_{tv}$ for television signal receiver 32 and a power signal $V_{cd}$ for compact disk player 34 is included in the receiver.

The CDP-incorporated television receiver also includes a television controller 42 for controlling the supply of power from power source 40 to the respective parts of the receiver by setting the receiver in a television mode or a compact disk mode selected in response to a second control signal C2 input via control box 26 or remote controller 27. The television controller 42 also controls the signal selection of video signal processor 36 and audio signal processor 38, and sends a first control signal C1 to compact disk player 34.

Video signal processor 36 includes a first selector 44 for selecting and outputting video signal V1 from television signal receiver 32 or video signal V2 from compact disk player 34, a video processor 46 for processing the video signal input from first selector 44 and outputting an RGB signal, a CRT driver 48 for receiving the RGB signal and displaying a video signal on CRT 10, and a second selector 50 for connecting the video signal V1 from television signal receiver 32 to an external video input terminal (EX) of compact disk player 34 during a background selection operation while the apparatus is in the compact disk mode. The output of first selector 44 is also supplied to a video jack MV for connection to an external monitor.

Video processor 46 includes a Y/C separator 52 for separating a video signal into color and luminance signals, a sixth selector 54 for selecting an S-VHS signal input from an external connection jack (not shown) or the Y/C separated signal. Video processor 46 also includes a signal processor 56 for performing sync signal (H/V) separation, luminance signal processing and color signal processing, mixing of an OSD signal with the processed RGB signal, and generating an RGB output. An RGB mixer 58 mixes the RGB signal supplied from compact disk player 34 and the RGB signal processed and output by signal processor 56.

Audio signal processor 38 includes an amplifier 60 for amplifying the audio signal A1 of the television signal from television signal receiver 32 to a level ranging from 0.4 $V_{rms}$ to 2 $V_{rms}$. A mixer 70 is included for mixing a signal input via a microphone 15 with the audio signal A2 output from compact disk player 34. A third selector 62 selects and outputs the audio signal from amplifier 60 or the audio signal from mixer 70, and a surround processor 64 receives the audio signal selected by third selector 62 and stereophonically processes the input audio signal. An audio output 66 echo-processes the surround-processed audio signal and drives a pair of speakers 12. A fifth selector 72 selects and outputs an input audio signal from television signal receiver 32 or at least one signal from among a plurality of externally input audio signals A11, A12 and S-A. The audio signal processor 38 also includes an audio input amplifier 68.

Here, the audio signal A1 from television signal receiver 32 is amplified in order to generate a single audio signal level from the different audio signal levels of the television audio signal A1 and the compact disk audio signal A2. Accordingly, the need for volume regulation is eliminated. Also, each of the audio signals is a dual-channel (L/R) signal.

Further, the output of third selector 62 is also supplied to the audio output jack MA for connection to an external speaker.

Television signal receiver 32 includes a fourth selector 74 for selecting and outputting an video signal input to television signal receiver 32 or at least one signal from among a plurality of externally input video signals V11, V12 and S-VHS. The television signal receiver 32 also includes a television signal processor 76 for receiving tuning data TD, selecting and tuning in a television broadcasting channel based on the tuning data TD, demodulating the television signal received via a tuned channel, and generating a video signal and an audio signal from the demodulated television signal.

Television controller 42 includes a microprocessor 84, a remote control signal receiver 86, and a control box 26. Here, microprocessor 84 receives the sync signals H/V from signal processor 56 of video processor 46 and supplies the OSD signal to signal processor 56. Microprocessor 84 also generates switching control signals X1 to X6 for controlling selectors 74, 44, 50, 54, 72 and 62, respectively, and generates tuning data TD. Remote control signal receiver 86 receives a remote control signal generated by either control box 26 or remote controller 27 and supplies the received signal as the second control signal C2 to both microprocessor 84 and compact disk player 34.

Power source 40 receives commercial AC power via a primary power source 78, generates a primary power voltage and also supplies a standby power voltage to television controller 42. Television power source 80 generates various power voltages for use in television signal receiver 32, video signal processor 36 and audio signal processor 38. CD power source 82 generates various power voltages for compact disk player 34 depending on a power control signal PW output by television controller 42.

Figure 4:
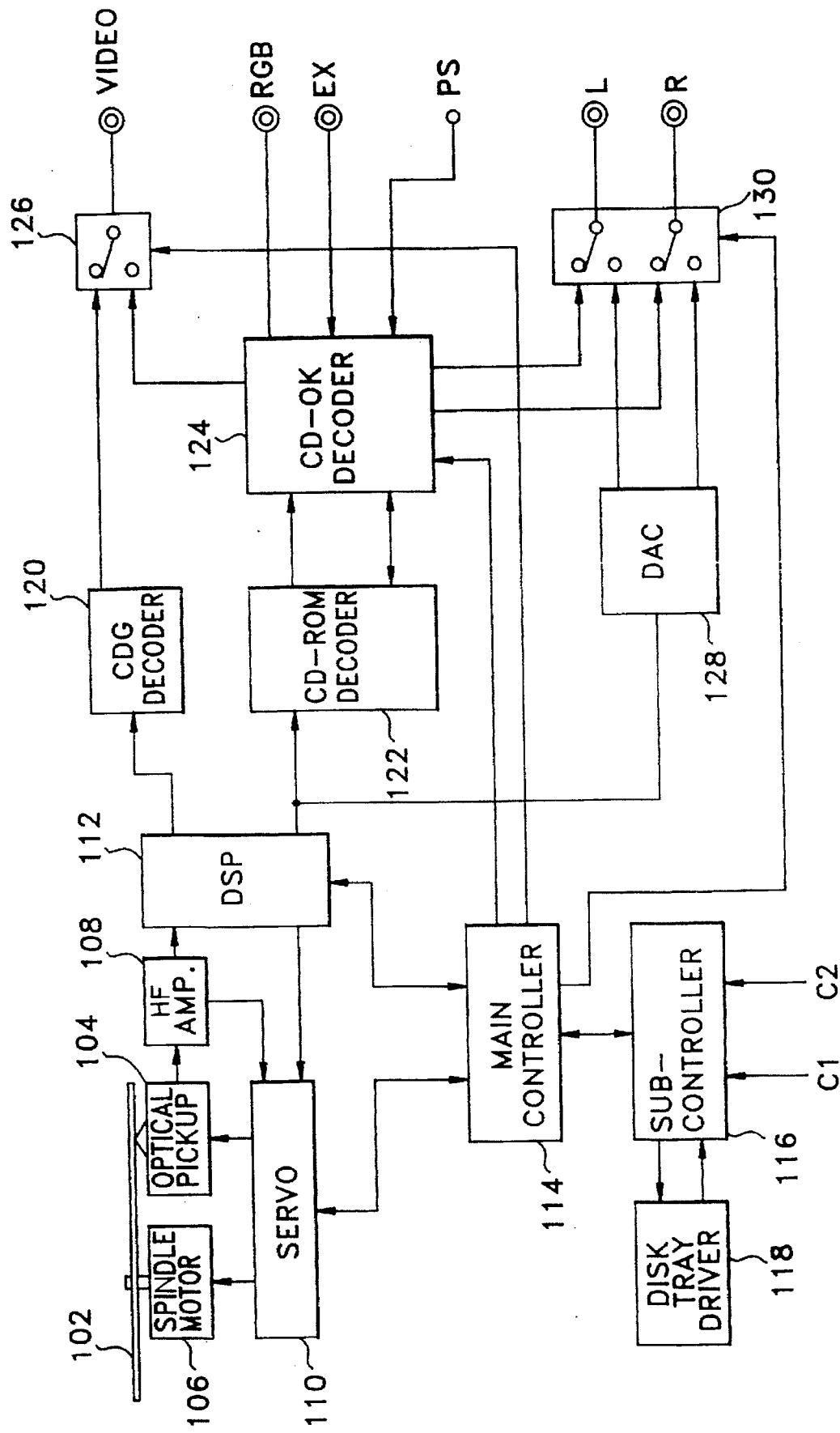
FIG. 4 is a circuit diagram of the compact disk player according to a preferred embodiment of the present invention shown in FIG. 3.

A circuit diagram of the compact disk player 34 is shown in FIG. 4, according to a preferred embodiment of the present invention. The compact disk player 34 circuit includes a compact disk 102, an optical pickup 104, a spindle motor 106, a high-frequency (HF) amplifier 108, and a servo 110. It also includes a digital signal processor (DSP) 112, a main controller 114, a sub-controller 116, and a disk tray driver 118. Further, the compact disk player 34 includes a CDG decoder 120, a CD-ROM decoder 122, a CD-OK decoder 124, a video selector 126, a digital-to-analog converter (DAC) 128, and an audio selector 130.

Referring to FIG. 4, the signal reproduced from compact disk 102 is output from digital signal processor 112 as a compact disk (CD) signal. Here, if the disk is a CDG type disk, a sub-code is transmitted to CDG decoder 120 to then reproduce and output an NTSC-encoded graphics signal. At this time, the CD signal is reproduced and output via DAC 128. Video selector 126 selects a video signal reproduced from CD-OK decoder 124 in the case where the compact disk 102 is a CD-OK type disk, otherwise it selects an output of CDG decoder 120. Audio selector 130 selects an accompaniment signal output from CD-OK decoder 124 in the case where the compact disk 102 is a CD-OK type disk, otherwise it selects an audio signal output from DAC 128. CD-0K decoder 124 receives data obtained by CD-ROM decoder 122, outputs musical instrument digital interface (MIDI) data as an accompaniment signal via an integrally formed sound source integrated circuit, or outputs the RGB video signal of the background screen upon which lyrics data are superimposed. The RGB video signal is output as an RGB signal or as a video signal via an integrally formed NTSC-encoder. Also, CD-OK decoder 124 receives an external video signal EX and outputs the external video signal superimposed with lyrics data, as a video signal.

As shown in FIG. 3, a signal input through microphone 15 is amplified by amplifier 88 and the amplified signal is detected by detector 90 and output as a detection signal PS. CD-OK decoder 124 receives the detected signal PS, performs a score determination and outputs the result with the video signal V2. Main controller 114, shown in FIG. 4, controls the overall system and controls the switching of video selector 126 and audio selector 130. Sub-controller 116 exchanges first control signal C1 with television controller 42 and receives a second control C2 input from remote control signal receiver 86. Sub-controller 116 compares first and second control signals C1 and C2, recognizes the remote control signal as a proper command signal if the two signals are identical, and performs operations corresponding to the commands.

The operation and effect of the present invention having the aforementioned configuration is described as follows.

First, when commercial AC power is applied, the television set maintains a standby state by means of the primary power source 78 of power source 40. That is to say, standby power is supplied to microprocessor 84 of television controller 42, maintaining the television in a waiting state until a power-on command is received. In this state, if a user presses power button 24 or inputs a power-on command via remote controller 27, power voltage is supplied to television signal receiver 32, video signal processor 36 and audio signal processor 38 via television power source 80. The television mode is always set as the initial mode. Therefore, initially, selectors 44, 62, 72 and 74 are switched to correspond to a television mode, and second selector 50 maintains an "off" state (open).

If the user presses the CD power key of control box 26 or a CD power key is input via remote controller 27, microprocessor 84 generates a power control signal PW to thereby enable CD power source 82. Accordingly, the power voltage is supplied from CD power source 82 to compact disk player 34. Compact disk player 34 reads disk information from a read-in area of the disk inserted through the disk door 16, shown in FIG. 1, and transmits to television controller 42 a control signal corresponding to the particular type of disk inserted in the compact disk player 34.

Television controller 42 controls the switching of selectors 44, 50, 54, 62, 72 and 74 depending on the disk type. If the disk is a digital audio disk, the switching control signal X6 is generated to switch third selector 62 to a CD mode and displays the relevant information, e.g., disk content information, on a CRT 10. Thus, the user can use the set interactively via remote controller 27 while watching the OSD display on CRT 10.

If the disk is a CDG type disk or a CD-OK type disk, switching control signals X2 and X6 switch selectors 44 and 62 to a CD mode. If the CD-0K disk is used for a song accompaniment function, the background screen recorded on the disk is supplied as a still screen.

If the user presses the background selection key of control box 26, a switching control signal X3 is generated, to close second selector 50. Thus, the television signal can be selected to provide the background screen during song accompaniment.

Also, if it is desired to receive the background picture from an external video source such as a video camera or videocassette recorder, the video output port of the corresponding device is connected to the external video input terminal (e.g., V11, V12, S-VHS). Then, the switching control signal X1 is generated to switch fourth selector 74 to select the corresponding external video signal.

If the external video is used as the background picture, compact disk player 34 receives the external video signal EX via its input port, and superimposes the internally generated lyrics information thereon. CRT 10 then displays the video signal superimposed with the lyrics information.

Also, compact disk player 34 may generate a composite video signal V2 or an RGB signal to be displayed on CRT 10 via RGB mixer 58 of video processor 46.

In order to minimize the power consumption, if the CD mode is not selected, CD power source 82 is disabled cutting off the supply of power to compact disk player 34.

As described above, according to the present invention, a television set and CD song accompaniment set are integrally formed in one body, thereby increasing the convenience in use, and supplying various background screens easily during a song accompaniment. Also, with the various parts of the CDP-incorporated television receiver being so integrally formed, material consumption is reduced.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A compact disk player (CDP)-incorporated television receiver comprising:

a television signal receiver for receiving a television (TV) signal, detecting audio and video signals from the received signal and outputting detected TV audio and TV video signals;

a compact disk player, having a song accompaniment function, for generating a first control signal, receiving a second control signal input via an instruction input unit, reading data from at least one type of compact disk (CD) if the second control signal indicates a CD mode, and outputting CD audio and CD video signals, wherein said first control signal indicates the type of CD read;

a video signal processor for generating a video processed signal and displaying the processed signal on a display, wherein the video processed signal is generated by receiving and selectively signal-processing the TV video signal and the CD video signal;

an audio signal processor for generating and outputting an audio processed signal via a sound converter, wherein the audio processed signal is generated by receiving and selectively signal-processing the TV audio signal and the CD audio signal;

a power source for receiving power from an external source and generating a power signal for said television signal receiver and a power signal for said compact disk player; and a television controller for setting said power source in one of a television mode and the compact disk mode selected in response to said second control signal input via the instruction input unit, controlling said video signal processor to select one of the TV video signal and the CD video signal and said audio signal processor to select one of the TV audio signal and the CD audio signal based on the first control signal, and supplying said first control signal to said compact disk player.

2. A CDP-incorporated television receiver as claimed in claim 1, wherein said video signal processor comprises:

a first selector for selecting one of the TV video signal of said television signal receiver and the CD video signal of said compact disk player and outputting the selected signal;

a video processor for processing the selected signal output from said first selector and outputting an RGB signal;

a display driver for receiving and displaying said RGB signal on the display; and a second selector for connecting the TV video signal of said television signal receiver to an external video input terminal of said compact disk player during a background selection operation while in the compact disk mode.

3. A CDP-incorporated television receiver as claimed in claim 1, wherein said audio signal processor comprises:

an amplifier for amplifying the TV audio signal of said television signal receiver to a predetermined level;

a mixer for mixing a microphone input signal with the CD audio signal of said compact disk player;

a first selector for selecting and outputting one of the audio signal of said amplifier and the audio signal output from said mixer; and an audio output processor for receiving the audio signal selected by said first selector and driving a speaker.

4. A CDP-incorporated television receiver as claimed in claim 1, wherein said television signal receiver comprises a selector for selecting and outputting one of the TV video signal and at least one externally input video signal.

5. A CDP-incorporated television receiver as claimed in claim 2, wherein the output of said first selector is also supplied as a video signal for an external monitor.

6. A CDP-incorporated television receiver as claimed in claim 3, wherein said audio signal processor further comprises a second selector for selecting and outputting one of the TV audio signal from the received television signal and at least one externally input audio signal.

7. A CDP-incorporated television receiver as claimed in claim 3, wherein the output of said first selector is also supplied as an audio signal for an external speaker.

8. A CDP-incorporated television receiver as claimed in claim 1, wherein the television signal receiver, the compact disk player, the video signal processor, the audio signal processor, the power source and the television controller are integrally formed into a single body.

9. A compact disk player (CDP)-incorporated television receiver comprising:

a television signal receiver for receiving a television signal and outputting audio and video signals;

a compact disk player, having a song accompaniment function, for detecting a type of compact disk, reading data from the compact disk and outputting audio and video signals;

a video signal processor for generating and displaying on a display a processed video signal, wherein the processed video signal is generated by receiving and selecting the video signal output from said television signal receiver and the video signal output from said compact disk player based on the type of compact disk detected by said compact disk player; and an audio signal processor for generating and outputting a processed audio signal, wherein the processed audio signal is generated by receiving and selecting the audio signal output from said television signal receiver and the audio signal output from said compact disk player based on the type of compact disk detected by said compact disk player.

10. A CDP-incorporated television receiver as claimed in claim 9, further comprising:

a power source for receiving AC power and generating a power signal for said television signal receiver, and a power signal for said compact disk player; and a television controller for controlling the power supply of said power source by setting a television or compact disk mode selected in response to a second control signal input via an instruction input unit, controlling said video signal processor to select one of the video signal output from said television signal receiver and the video signal output from said compact disk player, controlling said audio signal processor to select one of the audio signal output from said television signal receiver and the audio signal output from said compact disk player, and supplying a first control signal to said compact disk player.

11. A CDP-incorporated television receiver as claimed in claim 9, wherein said television signal receiver, compact disk player, video signal processor and audio signal processor are integrated as a single unit.

12. A CDP-incorporated television receiver as claimed in claim 1, wherein said power source generates the power signal for said compact disk player in response to an input via the instruction input unit to operate said compact disk player.

13. A CDP-incorporated television receiver as claimed in claim 10, wherein said power source generates said power signal for said compact disk player in response to an input via the instruction input unit to operate said compact disk player.

* * * * *